United States Patent
Watanabe et al.

(10) Patent No.: US 11,452,284 B2
(45) Date of Patent: Sep. 27, 2022

(54) FISHING LINE GUIDE AND FISHING ROD WITH THE SAME

(71) Applicant: Globeride, Inc., Tokyo (JP)

(72) Inventors: Masayuki Watanabe, Tokyo (JP); Norio Nasu, Tokyo (JP); Masaru Akiba, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 234 days.

(21) Appl. No.: 17/008,700

(22) Filed: Sep. 1, 2020

(65) Prior Publication Data

US 2021/0029981 A1 Feb. 4, 2021

Related U.S. Application Data

(63) Continuation of application No. 14/345,383, filed as application No. PCT/JP2012/079595 on Nov. 15, 2012.

(30) Foreign Application Priority Data

Nov. 15, 2011 (JP) .................................. 2011-249898
Mar. 28, 2012 (JP) .................................. 2012-073603

(51) Int. Cl.
*A01K 87/04* (2006.01)

(52) U.S. Cl.
CPC .................................. *A01K 87/04* (2013.01)

(58) Field of Classification Search
CPC ........ A01K 87/04; A01K 87/00; A01K 87/02; A01K 89/00; A01K 91/02; A01K 97/00; A01K 89/015; A01K 89/017

(Continued)

(56) References Cited

U.S. PATENT DOCUMENTS

| 8,387,302 B2 | 3/2013 | Akiba et al. |
| 8,813,415 B2 | 8/2014 | Akiba et al. |

(Continued)

FOREIGN PATENT DOCUMENTS

| CN | 102204523 A | 10/2011 |
| EP | 2 371 213 A2 | 10/2011 |

(Continued)

OTHER PUBLICATIONS

Official Action dated Nov. 4, 2014 in counterpart Chinese Application No. 201280047382.2 with English translation.

(Continued)

*Primary Examiner* — Kathleen I Alker
*Assistant Examiner* — Jeffrey R Larsen
(74) *Attorney, Agent, or Firm* — K&L Gates LLP

(57) ABSTRACT

A fishing line guide includes a fishing line guide section guiding a fishing line along a fishing rod, a first leg portion extending in a first direction from an end portion of the fishing line guide section and having a fixed portion disposed at a tip, and a second leg portion branching from either one of the end portion of the fishing line guide section and the first leg portion to extend in a second direction and having a fixed portion disposed at a tip are integrally configured, the fishing line guide including a first fiber-reinforced resin sheet, a second fiber-reinforced resin sheet, and a third fiber-reinforced resin sheet, each sheet including a laminated structure with a flat bonding surface, the laminated structure including a plurality of sheet-shaped synthetic resins containing reinforced fibers that are laminated together.

7 Claims, 21 Drawing Sheets

(58) Field of Classification Search
USPC .............................................. 43/24, 25, 18.5
See application file for complete search history.

(56) References Cited

U.S. PATENT DOCUMENTS

2010/0263257 A1* 10/2010 Akiba .................... A01K 87/04
                                                                  264/162
2011/0239519 A1   10/2011 Akiba et al.
2013/0192120 A1    8/2013 Akiba et al.

FOREIGN PATENT DOCUMENTS

| JP | 2011-004651 A | 1/2011 |
| JP | 2011-152092 A | 8/2011 |
| JP | 2011-205937 A | 10/2011 |
| JP | 2011-205998 A | 10/2011 |
| JP | 2011-239777 A | 12/2011 |
| JP | 2012-024075 A | 2/2012 |

OTHER PUBLICATIONS

Search Report dated Feb. 13, 2015 in counterpart European Application No. 12849293.1.
Official Action dated Feb. 5, 2018 in counterpart Korean Patent Application No. 10-2014-7000401 with English translation.

* cited by examiner

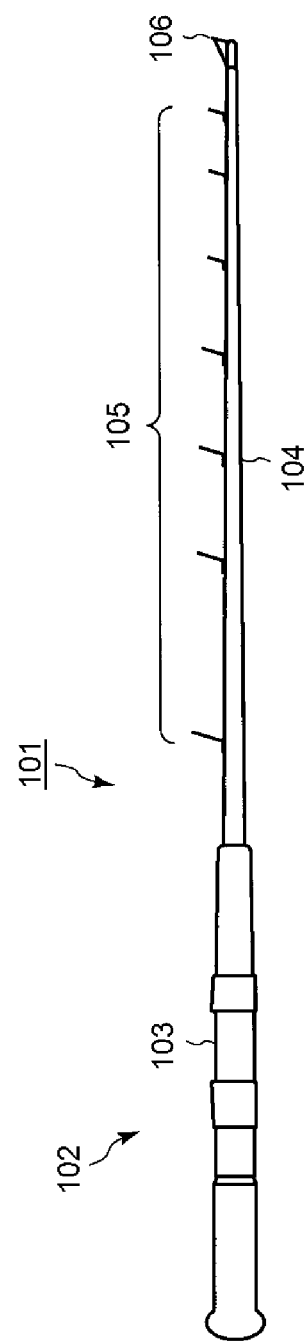

FISHING LINE GUIDE AND FISHING ROD WITH THE SAME

This is a continuation of U.S. Ser. No. 14/345,383, filed Mar. 17, 2014, which is a § 371 of International Application No. PCT/JP2012/079595, filed Nov. 15, 2012, which claims priority of Japanese Patent Application Nos. 2011-249898, filed Nov. 15, 2011, and 2012-073603, filed Mar. 28, 2012, the subject matter of which is incorporated by reference.

TECHNICAL FIELD

This disclosure relates to a fishing line guide that is formed of a resin material impregnating a reinforced fiber, and a fishing rod including the fishing line guide.

BACKGROUND ART

There are fishing rods in which a plurality of fishing line guides to pass through a fishing line to an outside (hereinafter, referred to as a fishing line guide) is disposed as a rod for fishing in general (hereinafter, referred to as a fishing rod). The fishing line guide that is disposed in such fishing rods is mounted on either an upper surface or a lower surface of the rod depending on the type of reel that is used.

For example, in a fishing rod on which a double-axis reel (or a bait reel that is used on freshwater and seawater) that is in wide use in boat fishing is mounted, the fishing line guide is mounted on an upper side of the fishing rod. In a fishing rod on which a spinning reel that is used on a rocky shore, a sandy beach, or a pond in many cases is mounted, the fishing line guide is mounted on a lower side of the fishing rod. Usually, these fishing line guides are configured to have a guide ring formed of SiC or the like that is fitted into a frame formed of a metal material such as titanium and stainless steel such that the fishing line is inserted and supported.

CITATION LIST

Patent Literature

PTL 1: Japanese Unexamined Patent Application Publication No. 2011-004651

SUMMARY

Technical Problem

Strength has been improved and reduction in weight of the rod through reduction in diameter has been achieved by advancement of manufacturing techniques of fishing rods. In a case where the multiple fishing line guides described above having a metal frame are mounted on the fishing rod that is reduced in weight, the weight of the rod as a whole increases. For example, when the fishing rod having a spinning reel such as a throwing rod with a length of 4 m or more is used, a user wants to cast an artificial fish bait from a seashore to the sea as far as possible. Accordingly, the flying distance is affected by a casting speed of the rod tip along with a supple flexibility of the fishing rod and thus a long cast operation is greatly affected by a flexural condition of the rod and reduction in weight.

As an example of fishing line guides reduced in weight, PTL 1 proposes a fishing line guide in which the frame is formed of a prepreg, that is, a reinforced fiber such as a carbon material over a plurality of layers impregnated with a thermosetting resin in an aligning manner or is formed of a woven base material. PTL 1 proposes a fishing line guide formed of the prepreg and having a one-leg (so-called single-foot) supporting leg portion connected to one fixed portion, and having a two-leg (so-called double-foot) supporting leg portion connected to two fixed portions. Only a conceptual configuration is presented for the two-leg fishing line guide.

In a case where the two-leg fishing line guide is actually formed, the two-leg fishing line guide has a structure in which a branching position is present to branch from one ring holding section to front and rear supporting leg portions. The branching position is bonded and thermoset as illustrated in FIG. 11 such that three sets of sheet members 11, 12, and 13 abut against each other. These sheet members are formed into a woven fabric in which reinforced fibers such as carbon fibers are woven through plain weaving or into an aligned shape in which the respective fibers are arranged to be parallel. Accordingly, when folding is performed during the bonding, the respective thin fibers are folded to cause a problem of weakened strength.

Accordingly, a structure in which at least one sheet member 13 is attached from a lower side to a branching position A of the two sets of the sheet members 11 and 12 branching forward and backward from the ring holding section not to be folded for abutting against each other has been suggested as illustrated in FIG. 11. When the sheet members are cured, a central part 19 of the branching position A becomes a gap, and is sealed by the resin oozing out from each of the sheet members to cause manufacturing variations in the fishing line guide.

In addition, a user may consider the sealing of the central part of the branching position A as non-defective and the presence of the gap may be determined as defective as the case may be even in the fishing line guide satisfying design performances (manufacturing standards) despite the presence of the gap at the branching position.

An object of the present invention is to provide a fishing line guide in which the abundance ratio of the gap at a branching position is constant while having no manufacturing variations, reduced in weight, and formed of a resin material impregnating a reinforced fiber, and a fishing rod including the fishing line guide.

Furthermore, in a case where the fishing line guide is configured to have the one-leg (so-called single-foot) supporting leg portion connected to the one fixed portion as illustrated in FIG. 14a, for example, a load from a fly line passing through the guide ring is imposed in a concentrated manner on the bent part rising from the fixed portion fixing the fishing line guide to the fishing rod to the supporting leg portion. In addition, when the fishing rod is carried, an impact on the bent part becomes great in the same manner even when a tip side of the guide ring is bumped.

As such, the prepreg is added to be formed to be thick and required strength is achieved to cover the bent part between the fixed portion and the supporting leg portion. In addition, a prepreg having the same thickness as or a thickness greater than the thickness of the prepreg arranged in the inner portion is formed to be attached to both surfaces of the guide ring such that a seam or the like is not exposed.

In this structure as illustrated in FIG. 20, a step between a fiber sheet 110a additionally arranged for reinforcement and a fiber sheet 110b in a lower layer may cause a small and substantially triangular gap m between a fiber sheet 109a and a fiber sheet 110a arranged to cover the surface when pressing and a thermal treatment are performed by a mold. In a case where the gap m is present, the strength is reduced compared to the absence of the gap m and variations in strength properties are generated. Furthermore, blocking of the gap m may be considered as non-defective and the presence of the gap may be determined as defective as the case may be even when the strength properties of the fishing line guide are within a design performance (manufacturing standard) range. In addition, it is preferable that the gap m be sealed in terms of external appearance.

An object of the present invention is to provide a fishing line guide in which a gap generated by a sheet end portion of a fishing line guide formed by a plurality of laminated fiber-reinforced resin sheets is blocked, reduction in strength is prevented, and an excellent external appearance is achieved, and a fishing rod including the fishing line guide.

Solution to Problem

To achieve the above-described object, according to an embodiment of the present invention, there is provided a fishing line guide in which a fishing line guide section guiding a fishing line, a first leg portion extending in one direction from an end portion of the fishing line guide section and having a fixed portion disposed at a tip, and a second leg portion branching from either one of the end portion of the fishing line guide section and the first leg portion to extend in another direction and having a fixed portion disposed at a tip are integrally configured, the fishing line guide including a first fiber-reinforced resin layer where a plurality of sheet-shaped synthetic resins containing reinforced fibers are laminated to form the fishing line guide section and the first leg portion, a second fiber-reinforced resin layer where the synthetic resins forming the fishing line guide section and the second leg portion are laminated to be fixed to the first fiber-reinforced resin layer to the branching position, a third fiber-reinforced resin layer where the synthetic resins are laminated to reach from the first leg portion to the second leg portion through the branching position and be fixed to the first fiber-reinforced resin layer and the second fiber-reinforced resin layer, and a branching gap member surrounded by the first fiber-reinforced resin layer to the third fiber-reinforced resin layer and positioned in the branching position.

To achieve the above-described objects, according to another embodiment of the present invention, there is provided a fishing line guide with a frame main body in which a plurality of fiber sheets in which a plurality of reinforced fibers are arranged and impregnated with a resin material having either thermosetting properties or a thermoplastic properties are laminated such that an annular fishing line guide section guiding a fishing line, a supporting leg portion extending from an end portion of the fishing line guide section, and a fixed portion bent and extending from a tip side of the supporting leg portion are integrally configured, the fishing line guide including a gap sealing member impregnating the reinforced fiber arranged along an extension direction of the end portion with the resin material with respect to a short-width fiber sheet not reaching an end surface of the frame main body and having an end portion in a lamination, in which the gap sealing member is arranged to abut along the end portion of the short-width fiber sheet and blocks a gap generated between an end surface of the end portion and the fiber sheet laminated to pinch the end surface by changing a cross-sectional shape during pressing and heating toward the frame main body.

Advantageous Effects of Invention

According to an embodiment of the present invention, it is possible to provide a fishing line guide in which the abundance ratio of the gap at a branching position is constant while having no manufacturing variations and formed of a resin material impregnating a reinforced fiber to be reduced in weight and increased in strength, and a fishing rod including the fishing line guide.

According to another embodiment of the present invention, it is possible to provide a fishing line guide in which a gap generated by a sheet end portion of a fishing line guide formed by a plurality of laminated fiber-reinforced resin sheets is blocked, reduction in strength is prevented, and an excellent external appearance is achieved, and a fishing rod including the fishing line guide.

BRIEF DESCRIPTION OF DRAWINGS

FIG. 6b is a view illustrating a configuration in which a branching position of the cured prepreg is seen through.

FIG. 13 is a view illustrating an external configuration of a fishing rod that includes a fishing line guide according to a fourth embodiment.

DESCRIPTION OF EMBODIMENTS

Hereinafter, embodiments of the present invention will be described in detail with reference to the drawings.

First Example

Figure 1:
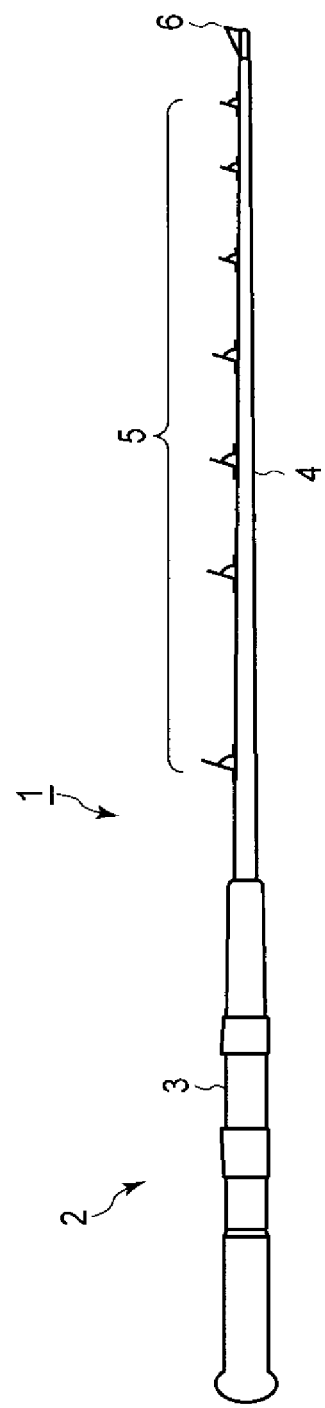
FIG. 1 is a view illustrating an external configuration of a fishing rod that includes a fishing line guide according to an embodiment of the present invention.
Figure 2:
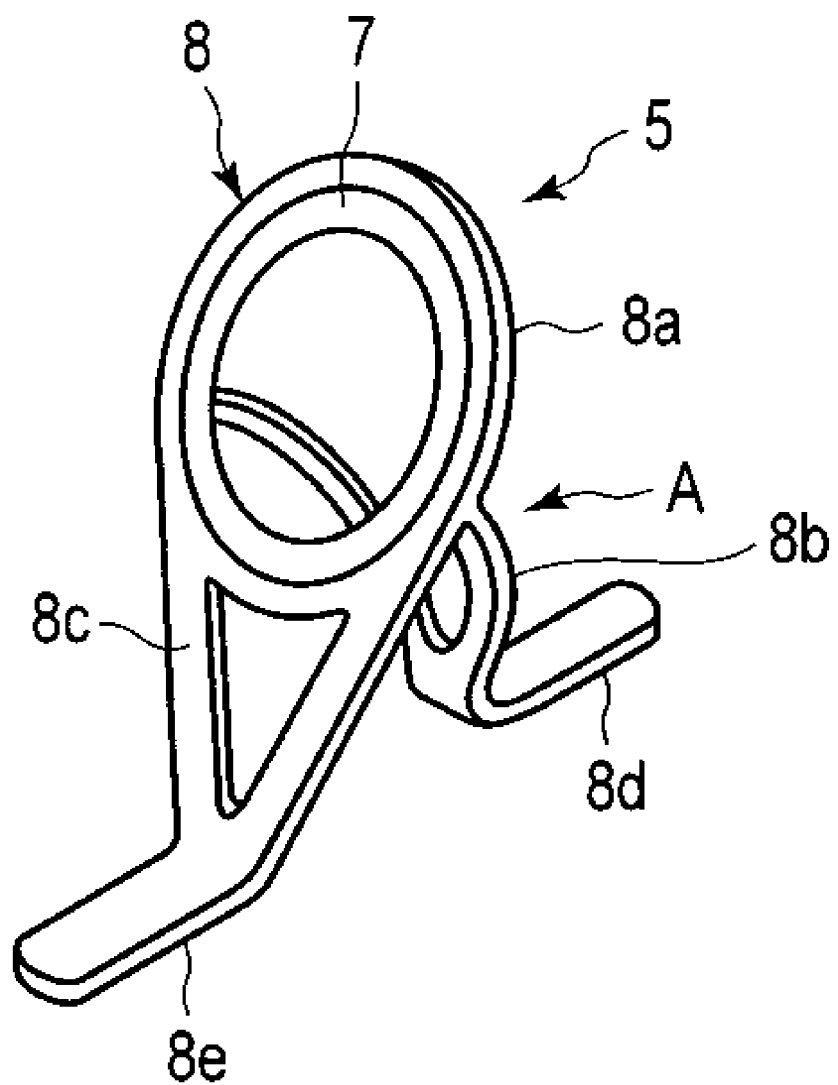
FIG. 2 is a view illustrating an external configuration of the fishing line guide according to the first embodiment.
Figure 3:
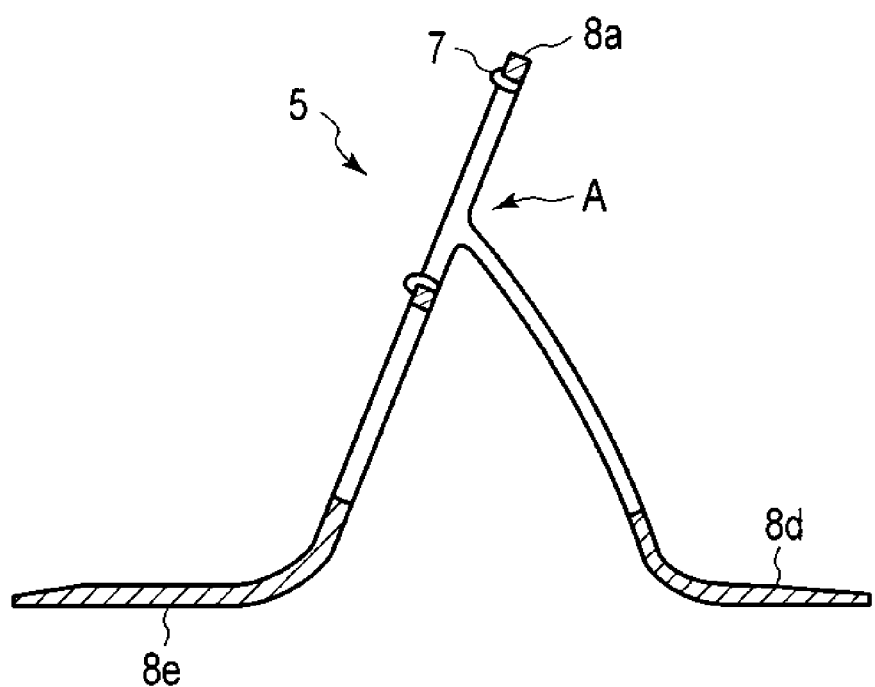
FIG. 3 is a view illustrating a cross-sectional structure of the fishing line guide.

FIG. 1 is a view illustrating an external configuration of a fishing rod that includes a fishing line guide according to an embodiment of the present invention, FIG. 2 is a view illustrating an external configuration of the fishing line guide according to the first embodiment, and FIG. 3 is a view illustrating a cross-sectional structure of the fishing line guide.

A fishing rod 1 of this embodiment may be a type of fishing rod where a double-axis reel (or a bait reel), which is not illustrated herein, may be mounted on a reel seat 3 of a bat 2. A plurality of fishing line guides 5 may be disposed apart from each other on an upper surface of a rod main body 4, and a top guide 6 may be disposed at a rod tip. In the following description, a rod tip side of the fishing rod is referred to as the front, and a rod back side is referred to as the rear.

The fishing line guide 5 may be configured to have a frame 8 that may be formed of a fiber-reinforced resin material impregnated with a resin, which will be described later, and a guide ring 7 that may be formed of SiC or the like. The guide ring 7 may be fitted into a ring-shaped ring holding section (fishing line guide section) 8a that may be disposed in an upper portion of the frame 8. In each of the embodiments including the following, the ring holding section 8a may have an annular shape such as circular, elliptic, elongated circular, and oblong shapes, and end portions thereof may include all ends on a circumferential end such as an upper end, a lower end, and a side end.

FIG. 2 illustrates the fishing line guide 5 that may have, for example, two-legged supporting leg portions 8b and 8c. The supporting leg portions 8b and 8c may have a height (length) to separate a fishing line (fly line) by a predetermined distance from the fishing rod. Of two legs of the fishing line guide illustrated in FIG. 3 in the description of this embodiment, the leg that may substantially linearly extend from the ring holding section (fishing line guide section) 8a to be connected to a fixed portion may be referred to as a main leg portion (first leg portion) 8c which may be fixed to the rod. In addition, the leg that may branch from the other ring holding section 8a to be connected to the fixed portion may be referred to as an auxiliary leg portion (second leg portion) 8b which may support the main leg portion 8c and may prevent line entanglement. The fishing line guide 5 may fix any one of the leg portions toward the rod tip or a rod back, and a main/auxiliary relationship between the leg portions may not be limited.

The main leg portion 8c may extend along a frame surface from any two positions of the ring holding section 8a, may form a V shape by thinning for reduction in weight, and may be bent horizontally to be connected to a fixed portion 8e. The auxiliary leg portion 8b may branch at a branching position A obliquely downward from any two positions of the ring holding section 8a, may form a V shape to perform guide to prevent the entanglement of the fishing line, and may be bent horizontally to be connected to a fixed portion 8d. Each of the fixed portions 8d and 8e may be placed at a predetermined position of the fishing rod and may fix the line by winding the line, and a wrapping or coating treatment may be performed by using a resin or the like from a line surface.

Figure 4:
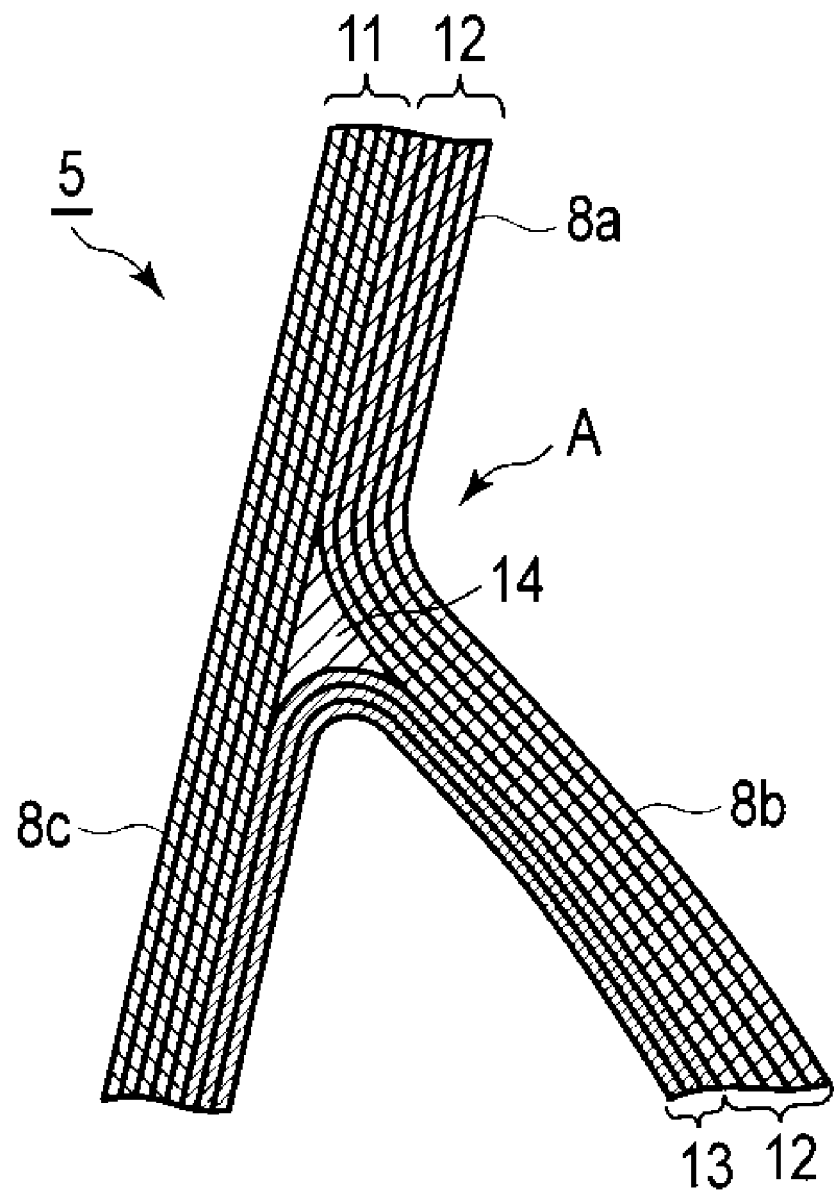
FIG. 4 is an enlarged view illustrating a branching position of the fishing line guide.

FIG. 4 is an enlarged sectional view illustrating the branching position of the fishing line guide. As illustrated in FIG. 4, the frame 8 may be formed through abutting and thermosetting of a laminated sheet 11 (first fiber-reinforced resin layer), a laminated sheet 12 (second fiber-reinforced resin layer), and a laminated sheet 13 (third fiber-reinforced resin layer) in which a plurality of prepregs are laminated. The prepregs may be sheet members aligned such that multiple reinforced fibers such as carbon fibers may be arranged in the same direction or may be woven by plain weaving or the like and may be impregnated with a matrix resin which may be cured by thermal processing. The sheet members may be overlapped by combining fiber directions of the reinforced fibers into a plurality of directions such that the frame 8 may have a strength based on a design value. In this case, the strength in a direction along the fiber direction increases. In a case where the prepreg in which the reinforced fiber is woven by the plain weaving or the like is used, a weaving width thereof may be narrower than a width of a frame site whose finished dimension is a minimum width, for example, a width of the auxiliary leg portion 8b.

In addition, it is preferable that the main leg portion 8c and the auxiliary leg portion 8b have a bending radius (R) at the branching position A at which no damage such as folding may be caused to at least the reinforced fiber. The degree may vary depending on materials of the reinforced fibers that may be used, fiber diameters, fiber arrangement directions (alignment directions), and the like, and may be various values. In a case of use in the guide, it is preferable that the radius R be larger than t1 and t2 and, for example, the radius R be at least 2 mm when the main leg portion 8c has a layer thickness t1 and the auxiliary leg portion 8b has a layer thickness t2.

A glass fiber, an aramid fiber, a metal fiber, a synthetic resin fiber, or the like can be used as well as the carbon fiber as the reinforced fiber of this embodiment. In addition, a thermoset resin or a thermoplastic resin can be employed as the matrix resin. For example, an epoxy resin, a polyamide resin, a phenolic resin, an unsaturated polyester resin, and the like can be used. As a branching gap member 14, an ABS resin, a synthetic rubber, a foaming material, and the like can be employed as other members although not having such a high rigidity as the matrix resin. It is preferable that the other members be a member not dissolved at a curing temperature of the matrix resin. By a material whose rigidity may be lower than the fiber-reinforced resin layer forming the frame, the guide may be likely to be easily deformed and may be unlikely to be damaged.

Figure 11:
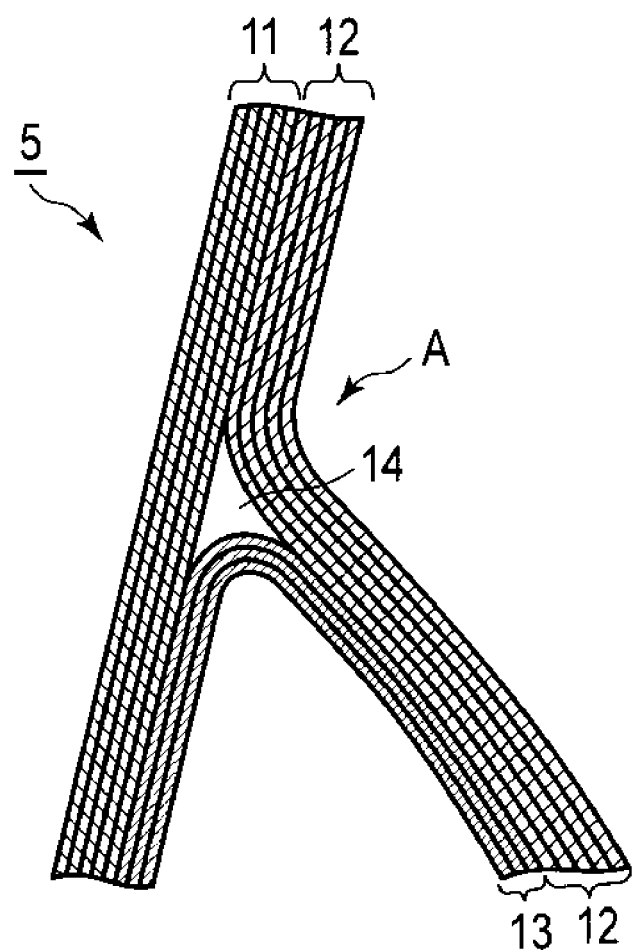
FIG. 11 is an enlarged view illustrating a branching position of a fishing line guide according to the related art.

The above-described branching position A illustrated in FIG. 11 may be bonded and thermoset such that the three sets of laminated sheets 11, 12, and 13 abut against each other from three directions. A branching position A according to the related art may have a gap generated or may be sealed as an extra resin may ooze out.

In a case where the mounted fishing rod is bent, either one of a first effect of the two legs being narrowed therebetween and the fishing line pulling up the ring holding section 8a from the fixed portion in a separation direction (of pulling the supporting leg portion) and a second effect of the two legs being expanded therebetween and the fishing line pressing the ring holding section 8*a* in a downward direction to a fixed portion side may be generated at the branching position A. In other words, when the fishing line guide is arranged on a lower side of the fishing rod and a spinning reel may be used in the fishing rod, the first effect may work in a case where a load is imposed for the fishing line to be bent downward. When the fishing line guide is arranged on an upper side of the fishing rod and a double-axis reel may be used in the fishing rod, the second effect may work in a case where a load is imposed for the fishing line to be bent downward. According to these effects, the load imposed on the fishing line may be changed to change a bent state of the fishing rod and the load imposed directly from the fishing line may be changed as well, and thus the load changing in terms of strength or vibration may be imposed on the fishing line guide 5. Because of these loads, a pressing force or a peel-off force may work on respective bonding surfaces of the three sets of the laminated sheets 11, 12, and 13 at the branching position A.

As illustrated in FIG. 4 in this embodiment, the branching gap member 14 that may be formed of the same resin material as the sheet member is integrally disposed to fill a gap of the branching position A. The branching gap member 14 may be adhered (welded) to each of the bonding surfaces of the laminated sheets 11, 12, and 13, and thus a force working between the bonding surfaces can be alleviated. In addition, peeling or cracking that may be generated between the bonding surfaces of the laminated sheets may be prevented.

Figure 5:
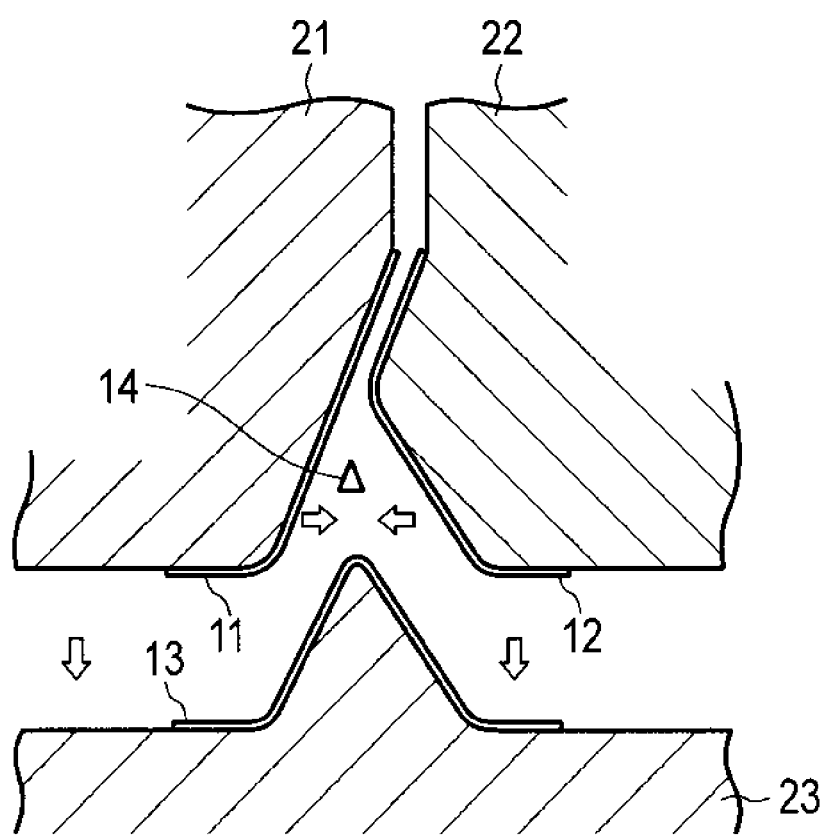
FIG. 5 is a conceptual view illustrating press molding-based manufacturing for forming the fishing line guide.
Figure 6A:
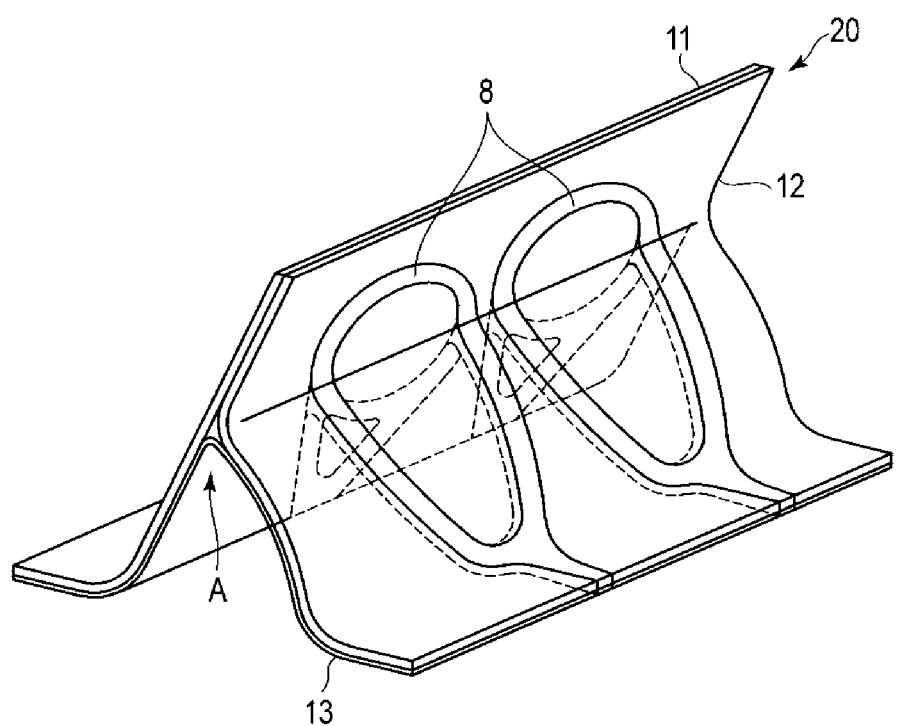
FIG. 6a is a view illustrating an external configuration of a cured prepreg including the fishing line guide manufactured by press molding.
Figure 6B:
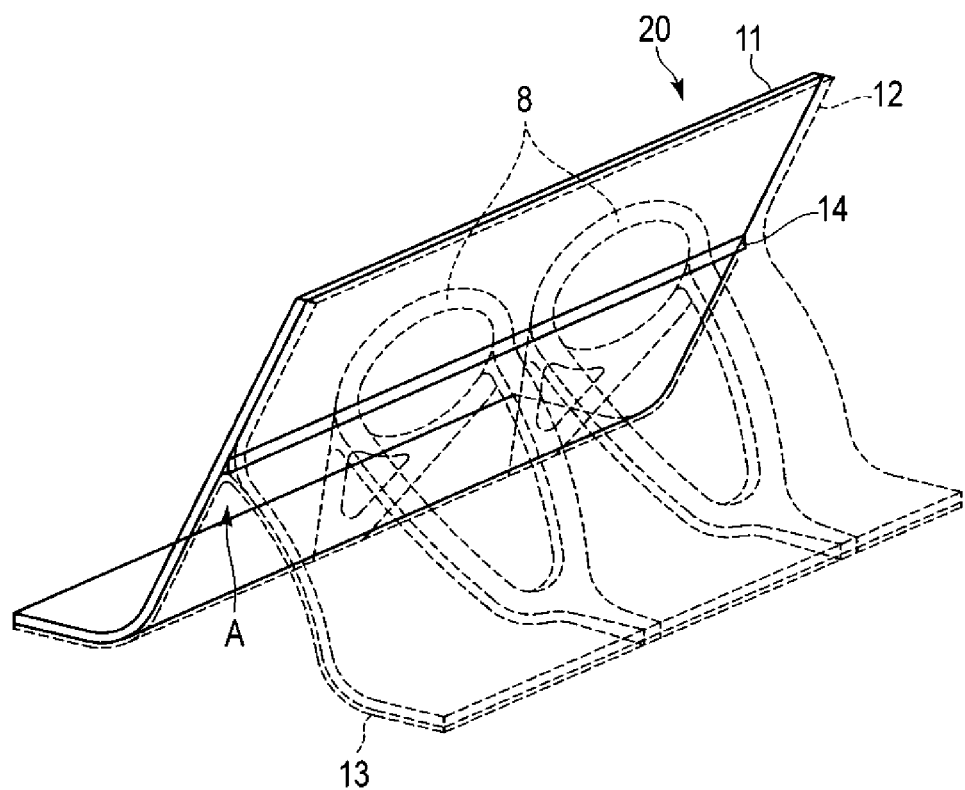

FIG. 5 is a conceptual view illustrating press molding-based manufacturing for forming the fishing line guide according to this embodiment, FIG. 6*a* is a view illustrating an external configuration of a cured prepreg molded article including the fishing line guide manufactured by press molding, and FIG. 6*b* is a view illustrating a configuration in which a branching position of the cured prepreg molded article is seen through.

The molding of the fishing line guide 5 by using the laminated sheets 11, 12, and 13 including the branching gap member 14 will be described with reference to FIGS. 4 and 5.

In this embodiment, the laminated sheets 11, 12, and 13 in which the plurality of thin prepregs are laminated may be loaded on respective molds 21, 22, and 23 for the press molding. Concave portions for setting the laminated sheets may be disposed on surfaces of these molds. Holding of the loaded laminated sheets 11 and 12 toward the molds 21 and 22 may be performed by using a mechanical component such as a metal claw or may be electrically performed through electrostatic adsorption or the like. A releasing agent may be applied such that the laminated sheet may be easily removed after the molding.

Next, the molds 21, 22, and 23 may be allowed to abut against each other at a predetermined position as illustrated in FIG. 5 by using a processing device (not illustrated). In this case, the branching gap member 14 may be inserted such that convex portions (tip parts) of the respective molds may be pinched at a facing position (branching position). The branching gap member 14 may have a rod shape to have a length exceeding widths of the laminated sheets, and may use a triangular cross-sectional shape similar to an internal shape of the branching position. The cross-section of the branching gap member 14 may be rectangular, but it is preferable that the cross-section have a shape in contact with the respective laminated sheets at a plane or a curved plane to prevent a corner part of the branching gap member 14 damaging the laminated sheets during pressurization in a thermal processing-based treatment.

A prepreg molded article 20 may be removed from the cooled molds 21, 22, and 23. The thermoset prepreg molded article 20 including the frame 8 may be formed as illustrated in FIG. 6*a*. In addition, at the branching position A, a resin member 14 may be dissolved to block the gap and may be formed to be adhered to the respective laminated sheets as illustrated in FIG. 6*b*.

The frame 8 may be cut from the prepreg molded article. Examples of methods for the cutting that can be used may include devices using a laser beam, water jet, or a cutting tool such as a laser processing device, a water jet processing device, and a resin NC processing device. The method for cutting the frame 8 may not be particularly limited.

When the cutting is performed, curved surface processing may be performed for a bottom surface of the fixed portion to sit well on the rod main body and groove processing may be performed such that imposing of a fixing line may be improved on an upper surface of the fixed portion. In addition, chamfering and barrel polishing may be performed on the frame 8 to prevent breakage from respective edges and to remove burrs. Furthermore, a film treatment for surface protection may be performed at a thickness entailing no increase in weight by using a member with hardness (for example, ceramic, glass, or a metal having corrosion resistance (from salt water)). A physical vapor layer growth technique (PVD: vapor deposition method, sputtering method, or the like) or a chemical vapor layer growth technique (CVD: CVD method) can be used for the film forming.

Then, the guide ring 7 may be fitted into the ring holding section 8*a* of the completed frame 8 by using a usual technique to be fixed by using an adhesive or the like. In addition, depending on the load from the fishing rod that may be used and the type of the fishing line, the guide ring may not be required but a ring holding section inner surface may be polishing-processed into a mirror shape, surface processing may be performed for a hard member to be laminated, and processing may be performed to facilitate guiding of the fishing line.

As described above, according to this embodiment, the resin member 14 formed of the resin material may be integrally disposed at a center of the branching position A of the frame 8 to be adhered to or seal the bonding surface of each of the laminated sheets 11, 12, and 13, and thus the force working between the bonding surfaces can be alleviated. Moreover, the peeling or cracking that may be generated between the bonding surfaces of the respective laminated sheets, which may be caused by the load on the fishing line and an effect of bending of the rod, can be prevented.

Modification Examples of First Embodiment

Next, a first modification example of the first embodiment will be described.

Figure 7A:
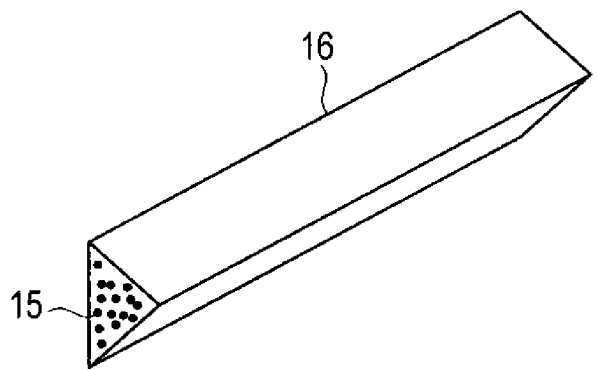
FIG. 7a is a view illustrating a branching gap member of a first modification example of the first embodiment.

In the above-described first embodiment, the branching gap member 14 that may be formed only of the resin member may be configured to be inserted into the branching position. However, in the first modification example, a branching gap member 16 that may contain a reinforced fiber 15 may be used as illustrated in FIG. 7*a*. A plurality of the reinforced fibers 15 may be put along a direction in which the branching gap member 16 may extend to have strength in a width direction of the frame 8.

Figure 7B:
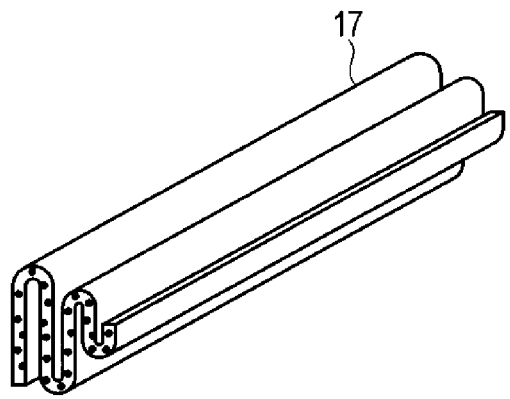
FIG. 7b is a view illustrating a branching gap member of a second modification example.

In a second modification example as illustrated in FIG. 7b, a prepreg 17 containing the reinforced fibers 15 may be used as the branching gap member in a triangularly zigzag manner in the fiber arrangement direction. Alternatively, the prepreg 17 may be used after being elongatedly cut and laminated in the fiber arrangement direction.

Figure 7C:
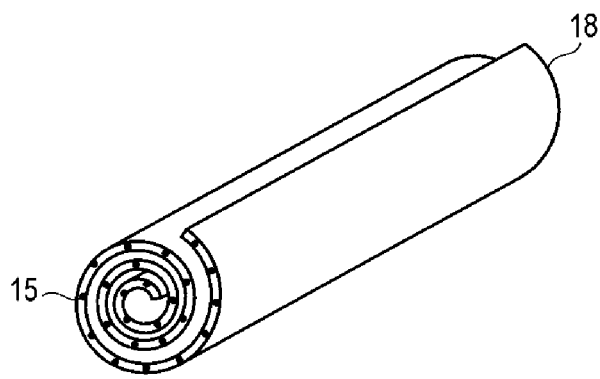
FIG. 7c is a view illustrating a branching gap member of a third modification example.

Furthermore, in a third modification example as illustrated in FIG. 7c, a prepreg 18 containing the reinforced fibers 15 may be used after being rounded to fit a size of the gap.

According to these modification examples, the same effects as in the above-described first embodiment can be achieved. Furthermore, it is possible to provide a fishing line guide whose strength may be increased by the reinforced fiber.

Second Embodiment

Figure 8:
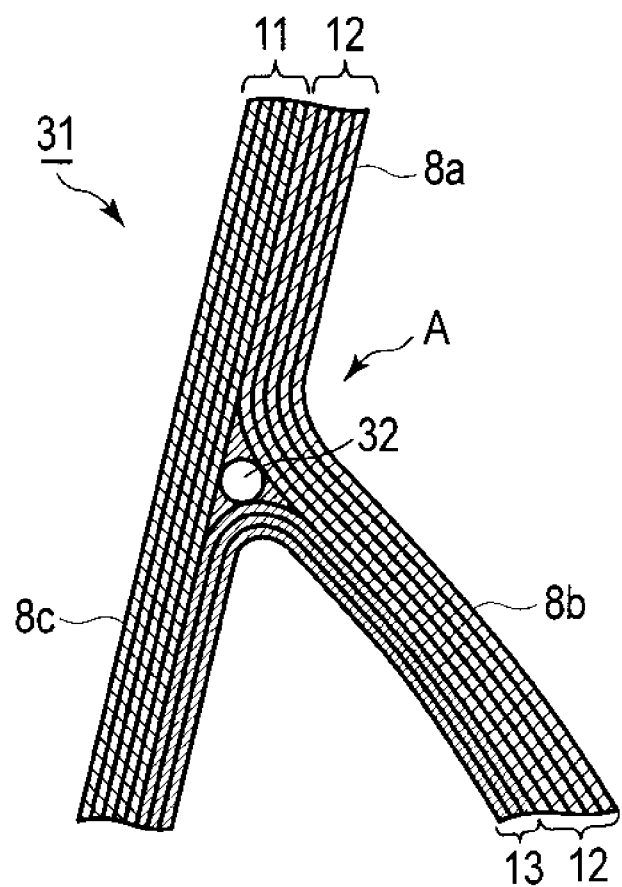
FIG. 8 is an enlarged view illustrating a branching position of a fishing line guide according to a second embodiment.
Figure 9:
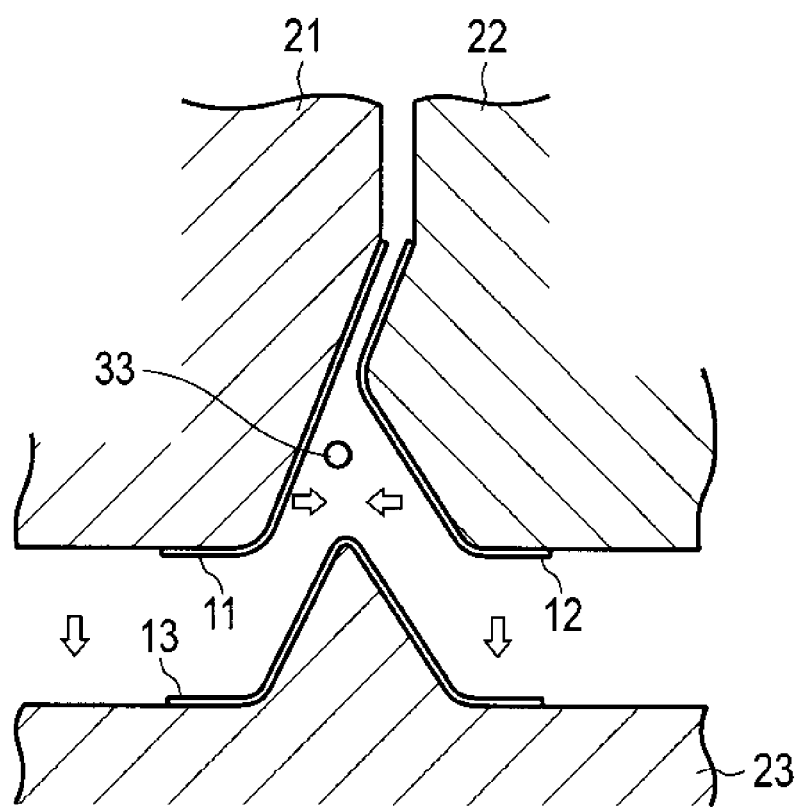
FIG. 9 is a view illustrating press molding for forming the fishing line guide according to the second embodiment.

FIG. 8 is an enlarged view illustrating a branching position of a fishing line guide according to a second embodiment. FIG. 9 is a view illustrating press molding for forming the fishing line guide according to this embodiment. In this embodiment, the same reference numerals are attached to the same sites as in the above-described first embodiment and description thereof will be omitted.

A fishing line guide 31 according to this embodiment may have a structure in which a gap 32 forming the same shape may be formed intentionally at the branching position A of the leg portion under a condition satisfying design performances (manufacturing standards). Despite the fishing line guide satisfying the performance as described above, a user may consider the presence of the gap as defective in a case where the abundance ratio of the gap are not constant. Accordingly, in this embodiment, the gap of the same shape may be intentionally formed at the branching position to reduce the variation of the abundance ratio of the gap.

As illustrated in FIG. 8, the gap 32 may be disposed at the branching position A of the fishing line guide 31 to have a shape matching with a facing state of respective surfaces of the three laminated sheets 11, 12, and 13, which may be a substantially triangular or circular shape in this embodiment. Since the gap may be disposed, a branching portion may have small rigidity, may be likely to be deformed, may be likely to follow the bending of the rod, and may be unlikely to be damaged.

FIG. 9 illustrates molding of the fishing line guide 31 for forming the gap 32.

As is the case with the above-described first embodiment, the laminated sheets 11, 12, and 13 where the prepregs are laminated may be loaded at a predetermined position of the molds 21, 22, and 23 for the press molding. Then, the molds 21, 22, and 23 may be allowed to abut against each other at a predetermined position by using a processing device as illustrated in FIG. 9. In this case, a punching die 33 may be inserted such that the convex portions (tip parts) of the respective molds may be pinched at a facing position (branching position). The punching die 33 may be a rod member whose cross-section may form a circular shape (cylindrical shape), and may be formed of metal or the like. Pressing and thermal processing may be performed by the molds 21, 22, and 23 in a state where the punching die 33 is inserted. In this heat treatment, a resin may melt out from the respective laminated sheets and be filled such that a gap between the punching die 33 and the laminated sheets 11, 12, and 13 may be blocked.

The prepreg molded article 20 that may be the same as illustrated in FIG. 6a may be removed from the cooled molds 21, 22, and 23. The punching die 33 may be pulled out from the thermoset prepreg molded article 20. Then, as is the case with the first embodiment, the frame may be cut from the prepreg molded article.

According to this embodiment, it is possible to provide the fishing line guide 31 in which the gap having a uniform shape may be disposed at the branching position. Accordingly, there can be a constant abundance ratio of gaps with different shapes at the branching position, and a situation of being considered as defective by the user can be prevented. In addition, since the gap has the uniform shape, design for reduction in weight can be taken. In addition, since the gap is standardized, the branching portion may have small rigidity, may be likely to be deformed, may be likely to follow the bending of the rod, and may be unlikely to be damaged. [Modification Example of Second Embodiment]

As a modification example, a triangular prism-shaped mold frame member that may have a hollow inner portion and may be formed of a resin may be used instead of the metallic punching die 33. The resin material that may be used in the mold frame member may be selected from materials which may not be deformed or dissolved during heat curing of the prepregs. A thin metal that may have corrosion resistance to salt or the like can be used. It is preferable that the mold frame member have a hollow and triangular prism shape, but the shape is not limited thereto. Instead, the shape may be a hollow ring shape such as a hollow circular shape and an oblong shape insofar as the shape is in contact with surfaces of the laminated sheets.

According to this modification example, the cutting of the frame can be performed without being pulled out from the thermoset prepreg molded article since the mold frame member may be used. In this manner, the manufacturing process may be simplified.

Third Embodiment

Figure 10:
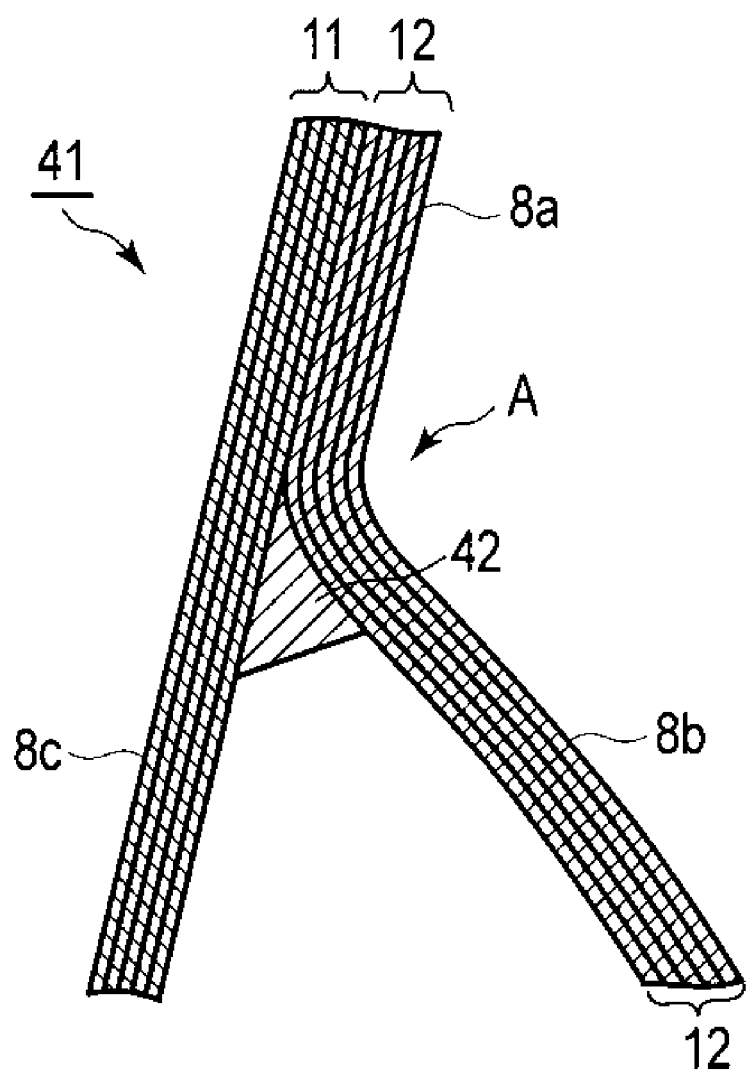
FIG. 10 is an enlarged view illustrating a branching position of a fishing line guide according to a third embodiment.

FIG. 10 is an enlarged view illustrating a branching position of a fishing line guide according to a third embodiment. In this embodiment, the same reference numerals are attached to the same members as in the above-described first embodiment and description thereof will be omitted. A load imposed on a fishing rod whose fishing target may be small fish may be relatively small. Accordingly, no substantial strength may be required for the fishing line guide as well, and there may be a case where reduction in weight is required the most.

In a fishing line guide 41 according to this embodiment, a laminated sheet (first fiber-reinforced resin layer) and a laminated sheet 12 (second fiber-reinforced resin layer) branch into two supporting leg portions (main leg portion 8b and auxiliary leg portion 8c) from the branching position A below the ring holding section to be connected to a fixed portion (not illustrated). At the branching position A, a branching gap member 42 may be attached during thermosetting processing of the laminated sheets 11 and 12 to be dissolved on and fixed to surfaces of the respective leg portions. The branching gap member 42 may be formed of the above-described thermoset resin or thermoplastic resin of the same material as the fishing rod, and may contain a plurality of reinforced fibers. In addition, a prepreg may be used.

According to this embodiment, the branching gap member 42 may be disposed at the branching position of the supporting leg portion, and thus splitting or peeling of the laminated sheets 11 and 12 can be prevented. Furthermore, this is suitable for a fishing line guide that may be mounted on the fishing rod with the relatively small load whose fishing target may be the small fish, and further reduction in weight can be achieved.

In each of the above-described embodiments, the fishing line guide that may include the two-legged fixed portion has been described. However, this can be applied to a guide including a branching position and can also be applied in the same manner to a branching position of a top guide mounted on a rod tip to achieve the same effect.

As described above, according to each of the embodiments of the present invention, it is possible to provide a fishing line guide that may be suitable for a fishing rod reduced in weight owing to advancement of fishing rod manufacturing techniques. In other words, not only may the weight of a rod as a whole be increased but also a weight balance of a fishing rod as a whole may be deteriorated in a case where multiple fishing line guides having a metal frame is mounted on a fishing rod reduced in weight.

Herein, multiple fishing line guides that may be small (compared to a base rod side) may be mounted on the rod tip side at a narrower gap. The rod tip side may tend to be heavy in view of the weight balance of the rod itself compared to the fishing rod having a structure according to the related art and a casting acceleration difference of the rod tip may cause handling to be difficult during a long cast in the fishing rod which may use a spinning reel. In the fishing rod that may use the spinning reel, examples of which may include a throwing rod cast long from a seashore with a length of over 4 m, it is desired that a flying distance be extended if possible. Accordingly, the flying distance may be affected by a casting speed of the rod tip along with a supple flexibility of the fishing rod and thus a long cast operation may be greatly affected by a flexural condition of the rod, reduction in weight, and the weight balance.

Regarding this problem, it is possible to achieve reduction in weight of the rod as a whole and achieve an increase in speed of the casting of the rod tip with the same throwing method as before without greatly changing the weight balance of the rod by employing the fishing line guide to which each of the above-described embodiments is applied.

Furthermore, since the frame of the fishing line guide may be formed by using the resin material which may be similar to the material of the fishing rod, the frame may be deformed following the bending of the rod when fixed to the rod, and thus it is possible to achieve a desired bending condition of the rod without damaging the supple flexibility of the fishing rod compared to the fishing line guide having the metal frame.

In each of the above-described embodiments, the first and second leg portions may extend independently of each other from end portions of different positions of the ring holding section (fishing line guide section) 8a, but the present invention may not be limited thereto. For example, the first and second leg portions may be configured to extend independently of each other from an end portion of the same position of the ring holding section (fishing line guide section) 8a.

Figure 12:
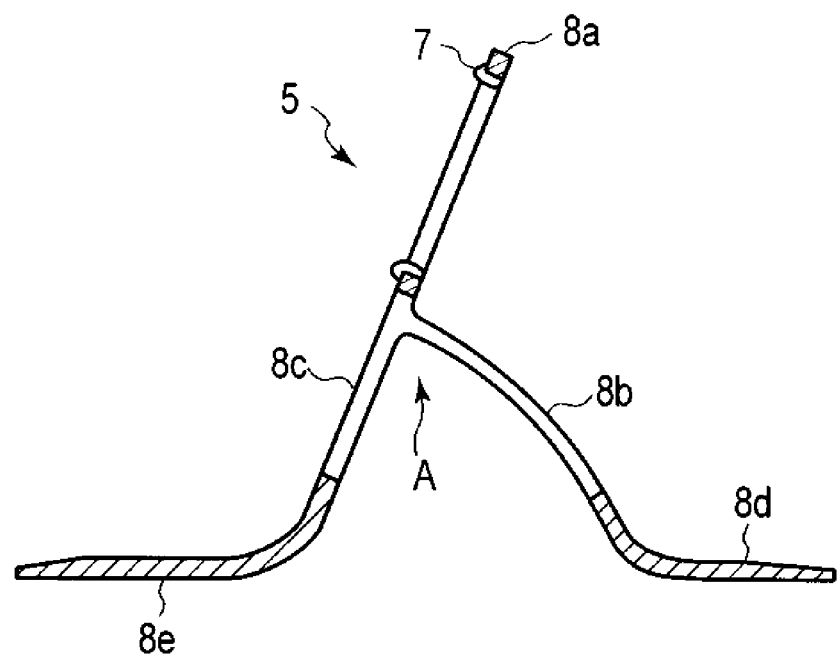
FIG. 12 is a view illustrating an example of a modification example of a leg portion of a fishing line guide.

Furthermore, as illustrated in FIG. 12, one of the leg portions may be configured to branch and extend from the other one of the leg portions. For example, the second leg portion 8b may be disposed to branch from a middle of the first leg portion 8c which may extend from the ring holding section (fishing line guide section) 8a formed by the laminated sheet 11 and the laminated sheet 12. In this case, the branching position A may be generated between the first leg portion 8c and the second leg portion 8b. Even in such a configuration, it is possible to provide a fishing line guide in which the resin member may be filled in the gap of the branching position or the gap of the uniform shape may be disposed at the branching position by applying the first to third embodiments described above.

The second embodiment of the present invention may include the following gists.

(1) A fishing line guide in which an annular fishing line guide section, a first leg portion extending from an end portion of the fishing line guide section and having a fixed portion disposed at a tip, and a second leg portion branching and extending from the fishing line guide section and having a fixed portion disposed at a tip are integrally configured, the fishing line guide including a first fiber-reinforced resin layer where a plurality of sheet-shaped synthetic resins containing reinforced fibers are laminated to form the fishing line guide section and the first leg portion, a second fiber-reinforced resin layer where the synthetic resins forming the fishing line guide section and the second leg portion are laminated to be fixed to the first fiber-reinforced resin layer between the fishing line guide section and the branching position, a third fiber-reinforced resin layer where the synthetic resins are laminated to reach from the first leg portion to the second leg portion through the branching position and be fixed to the first fiber-reinforced resin layer and the second fiber-reinforced resin layer, in which a gap surrounded by the first fiber-reinforced resin layer to the third fiber-reinforced resin layer and forming a predetermined shape is disposed at the branching position.

(2) The fishing line guide according to (1), in which the gap is formed by interposing a punching die during thermosetting processing of the first fiber-reinforced resin layer to the third fiber-reinforced resin layer.

(3) The fishing line guide according to (1), in which the gap is formed of a resin material or a metal material that is inserted into the branching position during the thermosetting processing of the first fiber-reinforced resin layer to the third fiber-reinforced resin layer and is not deformed or dissolved during heating.

Fourth Embodiment

Figure 14A:
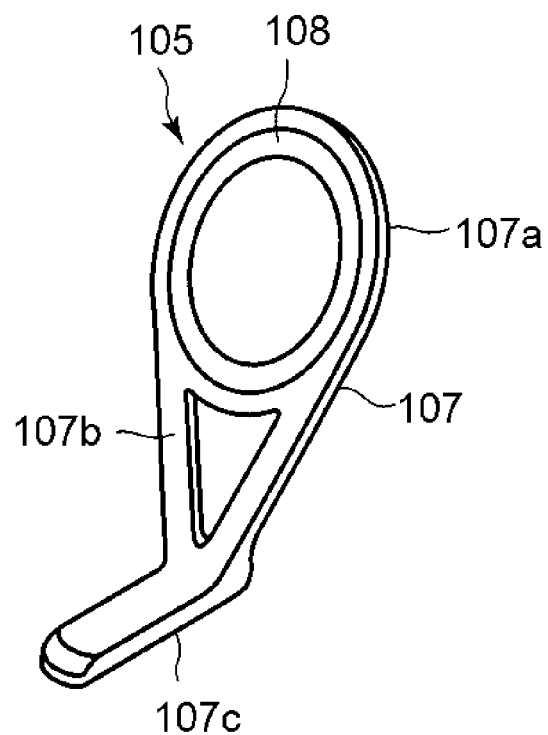
FIG. 14a is a view illustrating an external configuration of the fishing line guide of the embodiment.
Figure 14B:
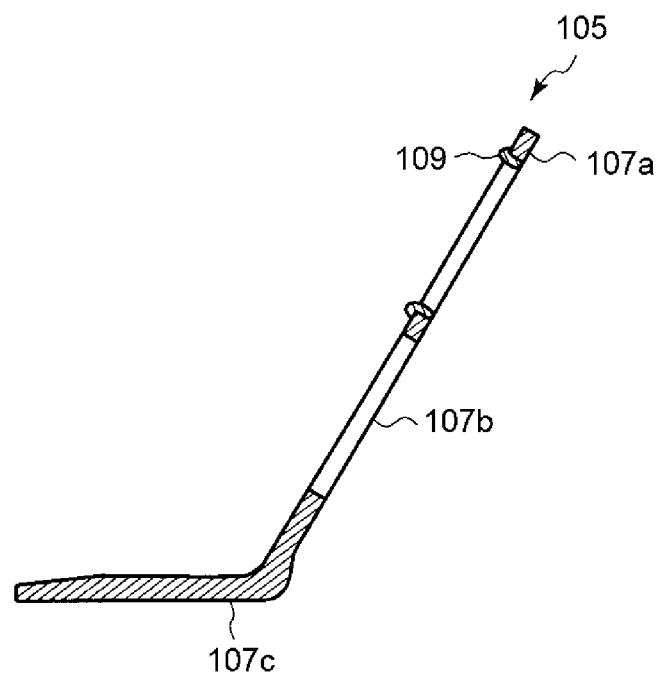
FIG. 14b is a view illustrating a cross-sectional configuration of the fishing line guide.
Figure 15:
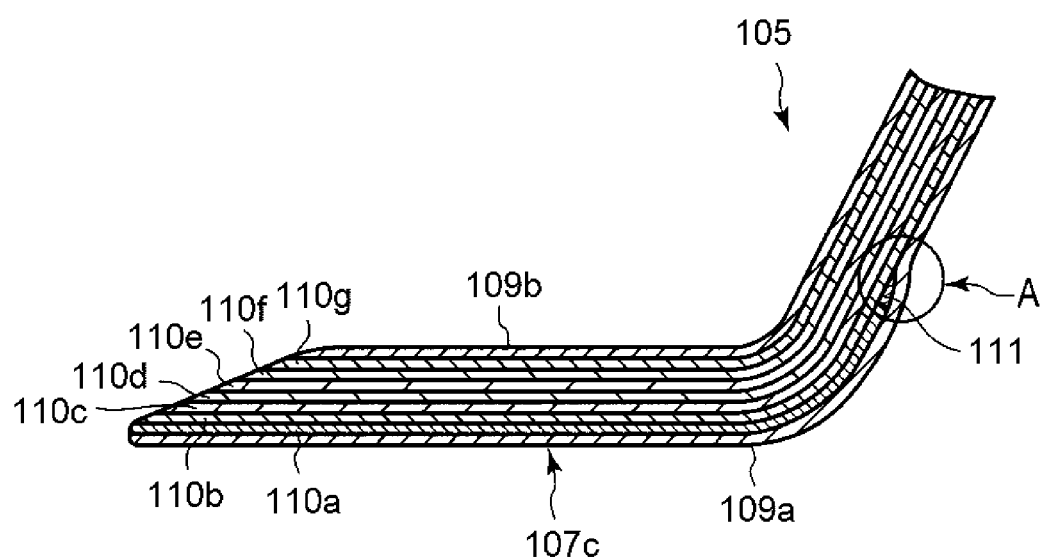
FIG. 15 is a partial cross-sectional structural view illustrating a laminated structure in which a bent part of the fishing line guide is enlarged.
Figure 16:
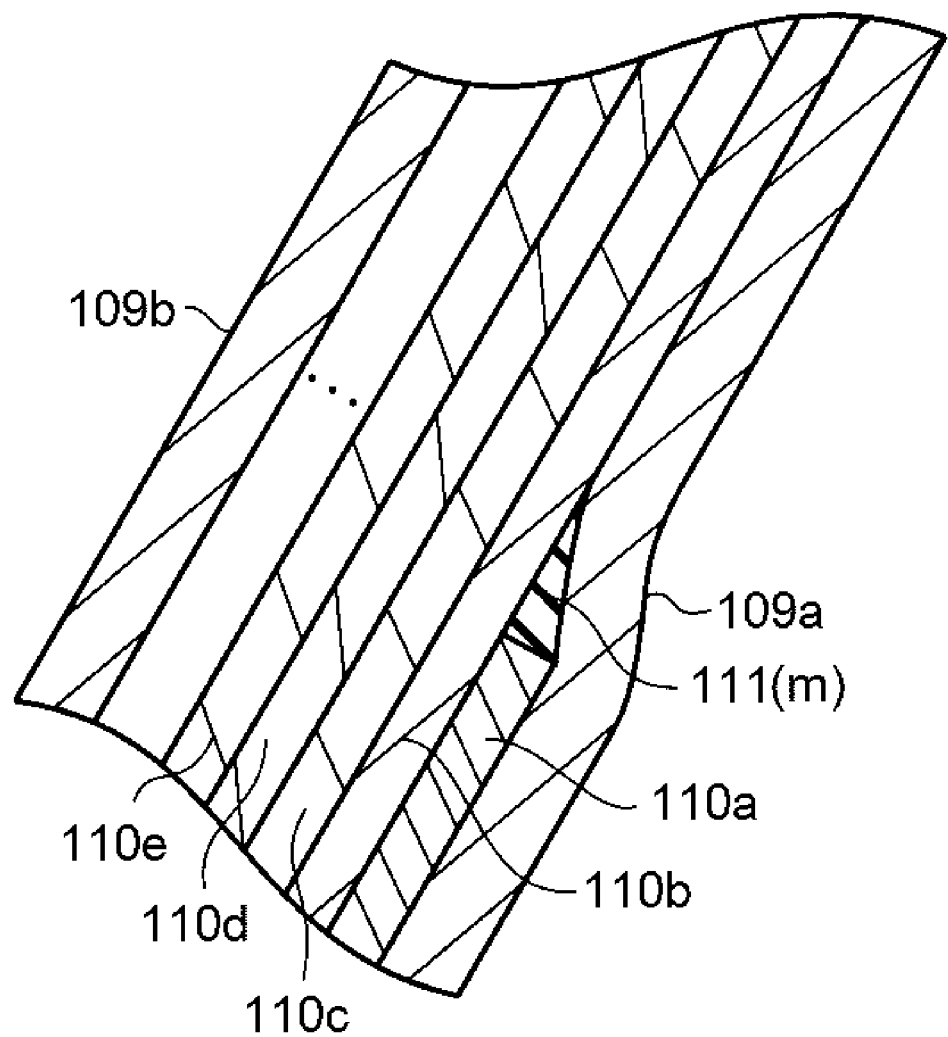
FIG. 16 is a partial cross-sectional structural view in which an area A of FIG. 15 is enlarged.

FIG. 13 is a view illustrating an external configuration of a fishing rod that includes a fishing line guide according to a fourth embodiment. FIG. 14a is a view illustrating an external configuration of the fishing line guide of this embodiment, and FIG. 14b is a view illustrating a cross-sectional configuration of the fishing line guide. FIG. 15 is a partial cross-sectional structural view illustrating a laminated structure in which a bent part of the fishing line guide is enlarged. FIG. 16 is a partial cross-sectional structural view in which an area A of FIG. 15 is enlarged.

A fishing rod 101 according to this embodiment may be a type of fishing rod where a double-axis reel (or a bait reel), which is not illustrated herein, may be mounted on a reel seat 103 of a bat 102. A plurality of fishing line guides 105 may be disposed apart from each other on an upper surface of a fishing rod main body 104, and a top guide 106 may be disposed at a rod tip. In the following description, a rod tip side of the fishing rod is referred to as the front, and a rod back side is referred to as the rear.

The fishing line guide 105 may be configured to have a frame main body 107 that may be formed of a fiber-reinforced resin sheet (hereinafter referred to as a fiber sheet) in which linearly extending reinforced fibers may be lined up and may be impregnated with a resin material, which may be a so-called prepreg, and a ring-shaped guide ring 108 that may be formed of SiC or the like.

The fiber sheets according to this embodiment may be sheet members in which multiple linearly-extending reinforced fibers such as carbon fibers may be arranged in the same direction or may be woven by plain weaving or the like and may be impregnated with a matrix resin which may be cured by thermal processing. A thermoset resin or a thermoplastic resin can be employed as the matrix resin. For example, an epoxy resin, a polyamide resin, a phenolic resin, an unsaturated polyester resin, and the like can be used. It is preferable that other members be a member not dissolved at a curing temperature of the matrix resin. A glass fiber, an aramid fiber, a metal fiber, a synthetic resin fiber, or the like can be used as well as the carbon fiber as the reinforced fiber of this embodiment.

The frame main body 107 may be configured such that a ring-shaped ring holding section (fishing line guide section) 107a that may be disposed on an upper side, a supporting leg portion 107b that may support the ring holding section 107a, and a fixed portion 107c that may be bent from the supporting leg portion 107b to be mounted on the fishing rod main body 104 illustrated in FIG. 13 may be integrated. The guide ring 108 may be fitted into and fixed to the ring holding section 107a. The ring holding section 107a may have any annular shape such as circular, elliptic, elongated circular, and oblong shapes.

The supporting leg portion 107b may have a height (length) to separate a fishing line (fly line) by a predetermined distance from the fishing rod. The supporting leg portion 107b may form a V shape from two positions below the ring holding section 107a and may be bent horizontally to be connected to the fixed portion 107c. The V shape of the supporting leg portion 107b may be a shape generated by hollowing out an inner portion into a substantially triangular shape to be unlikely to affect strength and achieve reduction in weight. As such, the supporting leg portion 107b may not necessarily have the V shape. The fixed portion 107c may be placed at a predetermined position of the fishing rod and may fix the line by winding the line, and a wrapping or coating treatment may be performed by using a resin or the like from a line surface.

Figure 20:
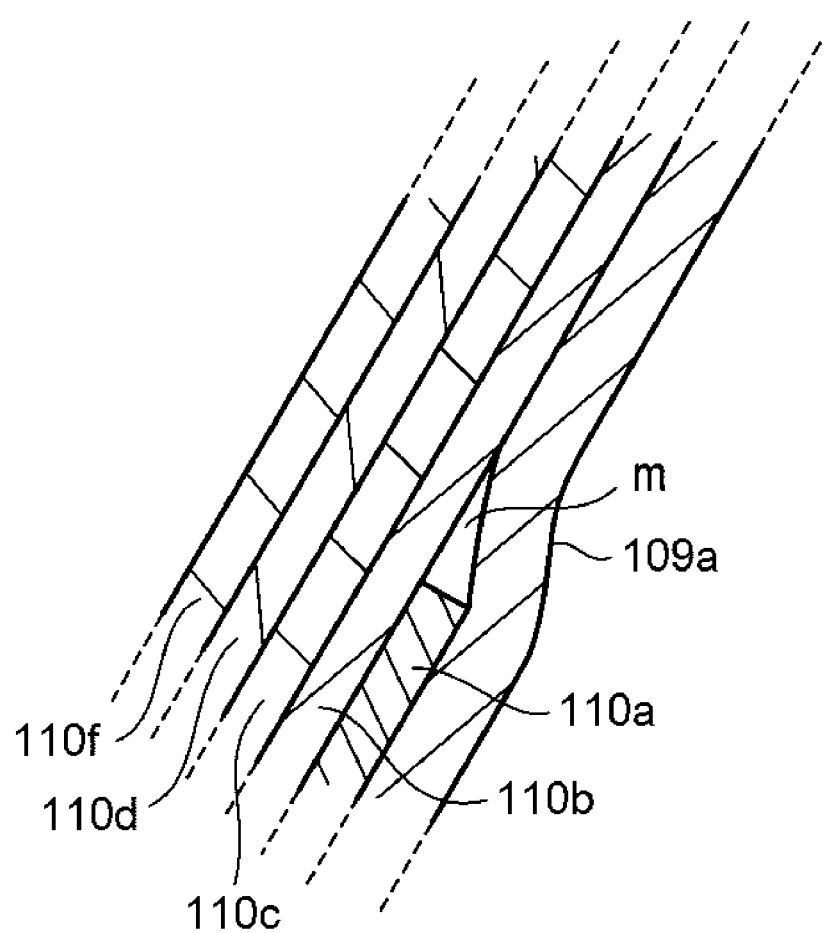
FIG. 20 is a view illustrating a partially enlarged cross-sectional structure corresponding to an area A of the fishing line guide of the related art in which a gap is generated at a reinforcement part.

As illustrated in FIGS. 15 and 16, the frame main body 107 may be integrally configured such that, for example, fiber sheets 110b to 110g may be laminated, a short-width reinforcing fiber sheet 110a which may cover from a lower surface of the sheet to a bent part may be attached from a lower surface side, and fiber sheets 109a and 109b may be laminated on an outermost surface such that both upper and lower surfaces of the short-width fiber sheet 110a, the fiber sheet 110b, and the fiber sheet 110g may be covered. Basically, the fiber sheets 109a, 109b, and 110b to 110g may be the same members such as fiber-reinforced resin sheets. The number of the above-described fiber sheets may be a number based on strength which may be required in design and may not be particularly limited. In addition, a gap m (FIG. 20) that may be present between the above-described fiber sheet 109a and the short-width fiber sheet 110a may be filled and blocked by a gap sealing member 111 which may be formed of the same material as the fiber sheets, which will be described later.

Figure 17:
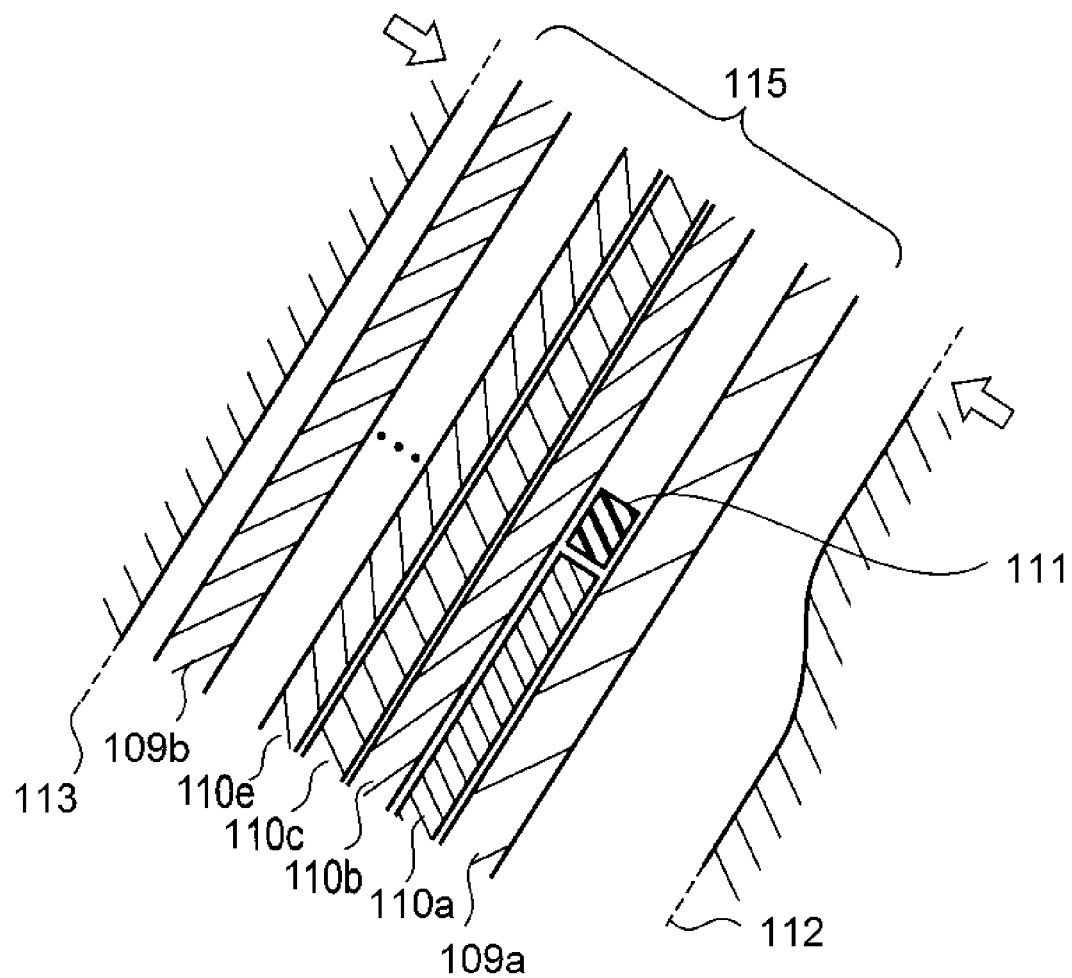
FIG. 17 is a conceptual view illustrating a plurality of laminated fiber sheets and a gap sealing member before press molding.
Figure 18A:
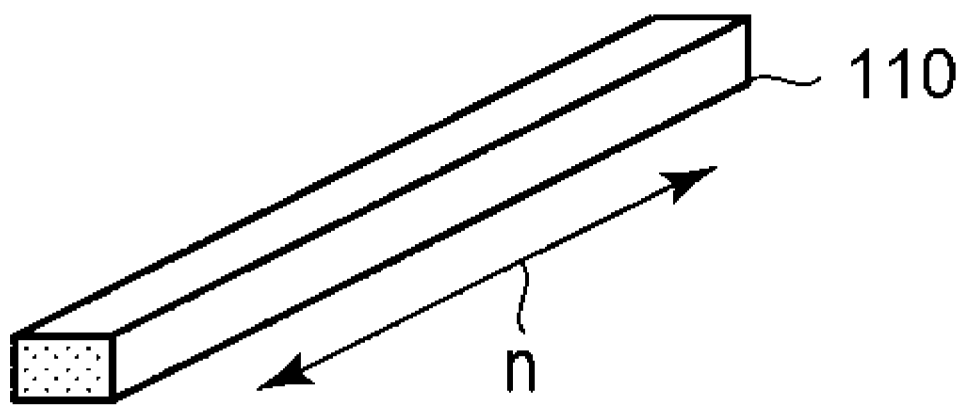
FIGS. 18a and 18b are views illustrating examples of external shapes of the gap sealing member.
Figure 18B:
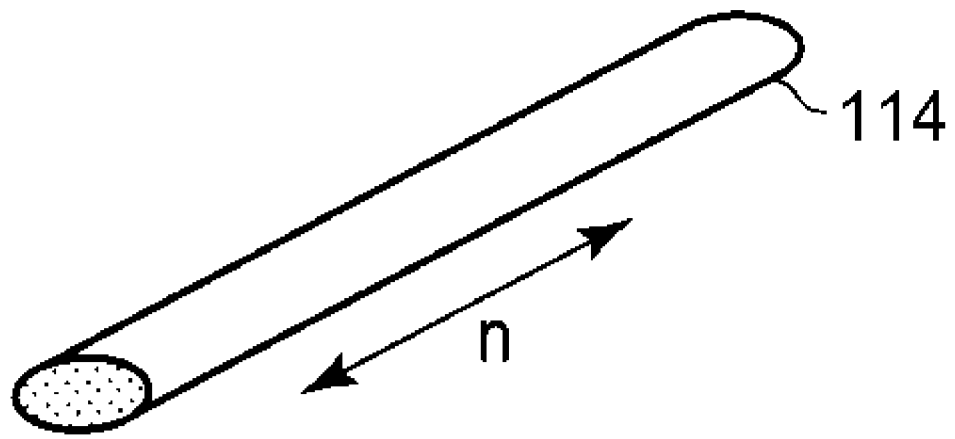
Figure 19A:
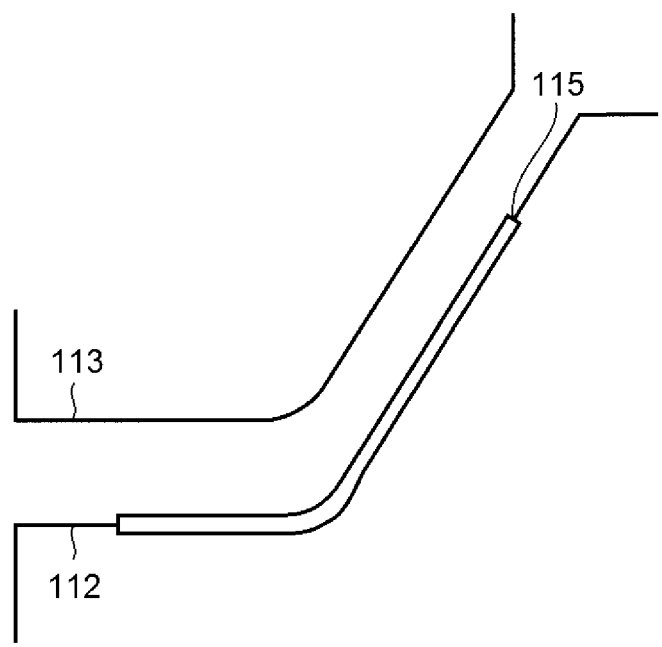
FIG. 19a is a conceptual view illustrating press molding-based manufacturing for forming a frame main body.
Figure 19B:
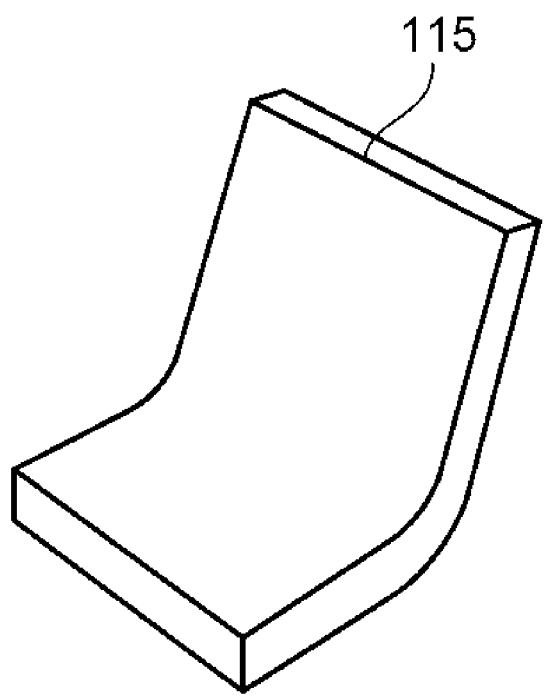
FIG. 19b is a fiber sheet including the frame main body that is formed.

FIG. 17 is a conceptual view illustrating the plurality of laminated fiber sheets and the gap sealing member before press molding. FIGS. 18a and 18b are views illustrating the gap sealing member. FIG. 19a is a conceptual view illustrating press molding-based manufacturing of the frame main body 107, and FIG. 19b is a view illustrating an external configuration of a fiber sheet that is integrally formed.

According to this configuration as illustrated in FIG. 17, the rectangular fiber sheets 110b to 110g that may be cores may be laminated and the short-width reinforcing fiber sheet 110a which may cover from the fixed portion 107c of the lower surface of the sheet to the bent part may be attached. Furthermore, the gap sealing member 111 may be arranged to be connected to an upper end of the short-width fiber sheet 110a, and the fiber sheets 109a and 109b that may be arranged on surfaces of both of the upper and lower surfaces thereof may be respectively laminated. These laminated fiber sheet 115, as illustrated in FIG. 19a, may be set in a concave portion of a mold 112, may be heated while being pressed by a mold 113, and may be integrally formed to be adhered to each other as resins of the respective fiber sheets may be dissolved.

Herein, the gap sealing member 111 illustrated in FIGS. 18a and 18b will be described.

The gap sealing member 111 illustrated in FIG. 18a may be a member that may seal the gap m which may be generated between the fiber sheet 109a, the fiber sheet 110a, and the fiber sheet 110b described above. The gap sealing member 111 may have the same structure as the fiber sheets and may form a prismatic shape in which multiple reinforced fibers may be arranged in the same straight-line direction as illustrated in FIG. 18a.

The gap sealing member 111 may be arranged at the upper end of the fiber sheet 110a illustrated in FIG. 17, and may be pressed by each of the fiber sheet 109a, the fiber sheet 110a, and the fiber sheet 110b during the pressing and heating processing and dissolution to match with a substantially triangular shape of the gap m such that each of the reinforced fibers may be moved. In other words, pressing from each of sheet surfaces 109a and 110b and a sheet end portion 110a that may be generated by pressing of the mold may work in a direction orthogonal to a fiber arrangement direction of the gap sealing member 111, and the dissolved and fluidic reinforced fiber of the gap sealing member 111 may be moved along with the resin material. By changing this cross-sectional shape, adhesion may cause no gap or lifting with each of the sheet surfaces, and the gap m may be sealed through integral solidification.

In addition, the gap sealing member 111 illustrated in FIG. 18a may have a prismatic shape, but the gap sealing member may be a cylindrical gap sealing member 114 illustrated in FIG. 18b. The shape may not be particularly limited insofar as a substantially triangular gap is blocked. Moreover, the gap sealing member 111 can be a wound or folded thin fiber sheet.

In addition, holding of the loaded fiber sheet 115 toward the mold 112 may be performed by using a mechanical component such as a metal claw or may be electrically performed through electrostatic adsorption or the like. A releasing agent may be applied such that the fiber sheet 115 may be easily removed after the molding.

Then, as illustrated in FIG. 19b, the integrally formed fiber sheet (prepreg molded article) 115 may be removed from the cooled molds 112 and 113. The frame main body 107 may be cut from the bent and plate-shaped fiber sheet 115. Examples of methods for the cutting that can be used may include devices using a laser beam, water jet, or a cutting tool such as a laser processing device, a water jet processing device, and a resin NC processing device. In this manner, known methods may be employed as the technique for cutting the frame main body 107, and the method may not be particularly limited.

Furthermore, when the cutting is performed, curved surface processing may be performed for a bottom surface of the fixed portion 107c to sit well on the rod main body and groove processing may be performed such that imposing of a fixing line may be improved on an upper surface of the fixed portion.

In addition, chamfering, tapering, and barrel polishing may be performed on the frame main body 107 to prevent cracking from respective edges and to remove burrs. Furthermore, a film treatment for surface protection may be performed at a thickness entailing no increase in weight by using a member with hardness (for example, ceramic, glass, or a metal having corrosion resistance (from salt water)). A physical vapor layer growth technique (PVD: vapor deposition method, sputtering method, or the like) or a chemical vapor layer growth technique (CVD: CVD method) can be used for the film forming.

Then, the guide ring 108 may be fitted into the ring holding section 107a of the completed frame main body 107 by using a usual technique to be fixed by using an adhesive or the like. In addition, depending on the load from the fishing rod that may be used and the type of the fishing line, the guide ring may not be required but a ring holding section inner surface may be polishing-processed into a mirror shape, surface processing may be performed for a hard member to be laminated, and processing may be performed to facilitate guiding of the fishing line.

According to this embodiment as illustrated above, the gap can be sealed by blocking the gap generated by the end portion of the additional fiber sheet with the gap sealing member which may be formed of a fiber sheet member such that the fixed portion 107c of the frame main body 107 may be strengthened. As such, variations in strength properties that may be attributed to the gap can be prevented even when the reinforcing member having the end portion in the laminated inner portion of the frame main body is added. Furthermore, finishing on a fishing line guide side surface may be improved, and an external appearance may be improved as well. In this embodiment, the gap generated by the end portion of the fiber sheet used to reinforce the fixed portion 107c has been described as an example, but the present invention may be applied to sealing of gaps at other positions such as a gap generated on a boundary with the supporting leg portion during reinforcement of the ring holding section.

In addition, in this embodiment, the fishing line guide that may have one supporting leg has been illustrated as an example, but the present invention may not be limited thereto and can be applied to any position insofar as the gap is generated by the end portion of the additional fiber sheet for reinforcement or the like, and may be embodied in the same manner with ease for fishing line guides having two or more supporting legs. In a case where the fishing line guide is employed in a fishing rod reduced in weight, the reduction in weight of the fishing rod may not be hampered but the reduction in weight of the fishing rod as a whole may be achieved.

REFERENCE SIGNS LIST

1 FISHING ROD
2 BAT
3 REEL SEAT
4 ROD MAIN BODY
5, 31 FISHING LINE GUIDE
6 TOP GUIDE
7 GUIDE RING
8 FRAME
8a RING HOLDING SECTION
8b AUXILIARY LEG PORTION
8c MAIN LEG PORTION
8d, 8e FIXED PORTION
11, 12, 13 LAMINATED SHEET
14, 16 BRANCHING GAP MEMBER
17, 18 PREPREG
19 CENTRAL PART
20 PREPREG MOLDED ARTICLE
21, 22, 23 MOLD
32 GAP
33 PUNCHING DIE
101 FISHING ROD
102 BAT
103 REEL SEAT
104 ROD MAIN BODY
105 FISHING LINE GUIDE
106 TOP GUIDE
107 FRAME MAIN BODY
107a RING HOLDING SECTION
107b SUPPORTING LEG PORTION
107c FIXED PORTION
108 GUIDE RING
109a, 109b, 110b to 110g FIBER-REINFORCED RESIN SHEET (FIBER SHEET: PREPREG)
110a SHORT-WIDTH FIBER SHEET
111, 114 GAP SEALING MEMBER (FIBER SHEET)
112, 113 MOLD

The invention claimed is:

1. A fishing line guide comprising a fishing line guide section guiding a fishing line along a fishing rod, a first leg portion extending in a first direction from an end portion of the fishing line guide section and having a fixed portion disposed at a tip, and a second leg portion branching from either one of the end portion of the fishing line guide section and the first leg portion to extend in a second direction and having a fixed portion disposed at a tip are integrally configured, the fishing line guide comprising:
  a first fiber-reinforced resin sheet;
  a second fiber-reinforced resin sheet;
  a third fiber-reinforced resin sheet;
  each sheet comprising a laminated structure with a flat bonding surface, the laminated structure comprising a plurality of sheet-shaped synthetic resins containing reinforced fibers that are laminated together,
  wherein the laminated structure of the first fiber-reinforced resin sheet forms the fishing line guide section and the first leg portion,
  the laminated structure of the second fiber-reinforced resin sheet is fixed to the first fiber-reinforced resin sheet via their flat bonding surfaces between the fishing line guide section and a branching position from which the second leg portion branches, and
  a branching gap member disposed in a gap that is formed at the branching position and is surrounded by the first fiber-reinforced resin sheet and the second fiber-reinforced sheet, the branching gap member being positioned at the branching position and surrounded by each of the flat bonding surfaces of the first fiber-reinforced resin sheet and the second fiber-reinforced resin sheet,
  wherein the first direction is a forward direction along the fishing rod, the second direction is a backward direction along the fishing rod, and the branching gap member is formed by a prepreg in which a plurality of reinforced fibers are arranged in a row and impregnated with a thermoset resin.

2. A fishing line guide comprising a fishing line guide section guiding a fishing line along a fishing rod, a first leg portion extending in a first direction from an end portion of the fishing line guide section and having a fixed portion disposed at a tip, and a second leg portion branching from either one of the end portion of the fishing line guide section and the first leg portion to extend in a second direction and having a fixed portion disposed at a tip are integrally configured, the fishing line guide comprising:

a first fiber-reinforced resin sheet;

a second fiber-reinforced resin sheet;

a third fiber-reinforced resin sheet;

each sheet comprising a laminated structure with a flat bonding surface, the laminated structure comprising a plurality of sheet-shaped synthetic resins containing reinforced fibers that are laminated together, wherein the laminated structure of the first fiber-reinforced resin sheet forms the fishing line guide section and the first leg portion, the laminated structure of the second fiber-reinforced resin sheet is fixed to the first fiber-reinforced resin sheet via their flat bonding surface, the second fiber-reinforced resin sheet branching to a branching position from which the second leg portion branches, the laminated structure of the third fiber-reinforced resin sheet extends from the first leg portion to the second leg portion through the branching position and is fixed to the first fiber-reinforced resin sheet and the second fiber-reinforced resin sheet via its flat bonding surface, and a branching gap member disposed in a gap that is formed at the branching position and is surrounded by the first fiber-reinforced resin sheet, the second fiber-reinforced sheet, and the third fiber-reinforced sheet, the branching gap member being surrounded by each of the flat bonding surfaces of the first fiber-reinforced resin sheet, the second fiber-reinforced resin sheet, and the third fiber-reinforced resin sheet and positioned at the branching position, wherein the first direction is a forward direction along the fishing rod, the second direction is a backward direction along the fishing rod, and the branching gap member is formed by a prepreg in which a plurality of reinforced fibers are arranged in a row and impregnated with a thermoset resin.

3. The fishing line guide according to claim 2, wherein a bending radius of the third fiber-reinforced resin sheet reaching from the first leg portion to the second leg portion through the branching position is larger than a layer thickness of each of the first fiber-reinforced resin sheet and the second fiber-reinforced resin sheet.

4. The fishing line guide according to claim 1, wherein the branching gap member is adhered to each of the flat bonding surfaces of each of the first, second, and third fiber-reinforced resin sheets.

5. The fishing line guide according to claim 2, wherein the branching gap member is adhered to each of the flat bonding surfaces of each of the first, second, and third fiber-reinforced resin sheets.

6. A fishing rod for fishing comprising a plurality of fishing line guides and an annular fishing line guide section, a first leg potion extending in a first direction from an annular end portion of the fishing line guide section and having a fixed portion disposed at a tip, and a second leg portion branching an extending in a second direction from either one of the annular end portion of the fishing line guide section and the first leg portion and having a fixed portion disposed at a tip are integrally configured are disposed, the fishing rod comprising the fishing line guide including:

a first fiber-reinforced resin sheet;

a second fiber-reinforced resin sheet;

a third fiber-reinforced resin sheet;

each sheet comprising a laminated structure with a flat bond surface, the laminated structure comprising a plurality of sheet-shaped synthetic resins containing reinforced fibers that are laminated together, wherein the laminated structure of the first fiber-reinforced resin sheet forms the fishing line guide section and the first leg portion, the laminated structure of the second fiber-reinforced sheet is fixed to the first fiber-reinforced resin sheet via their flat bonding surfaces between the fishing line guide section and a branching position from which the second portion branches, and where the laminated structure of the third fiber-reinforced resin sheet extends from the first leg potion to the second leg portion through the branching position and is fixed to the first fiber-reinforced resin sheet and the second fiber-reinforced resin sheet via its flat bonding surface; and a branching gap member disposed in a gap that is formed at the branching position and is surrounded by the first fiber-reinforced resin sheet, the second fiber-reinforced resin sheet, and the third fiber-reinforced resin sheet, the branching gap member being surrounded by each of the flat bonding surfaces of the first fiber-reinforced resin sheet, the second fiber-reinforced sheet, and the third fiber-reinforced resin sheet and positioned at the branching position, wherein the first direction is a forward direction along the fishing rod, the second direction is a backward direction along the fishing rod, and the branching gap member is formed by a prepreg in which a plurality of reinforced fibers are arranged in a row and impregnated with a thermoset resin.

7. The fishing rod according to claim 6, wherein the branching gap member is adhered to each of the flat bonding surfaces of each of the first, second, and third fiber-reinforced resin sheets.

* * * * *